United States Patent
Watanabe (10) Patent No.: US 9,173,296 B2
(45) Date of Patent: Oct. 27, 2015

(54) INFORMATION PROCESSING APPARATUS, INFORMATION PROCESSING METHOD, PROGRAM, AND BOARD MANUFACTURING SYSTEM

(71) Applicant: Yasuyuki Watanabe, Yokohama (JP)

(72) Inventor: Yasuyuki Watanabe, Yokohama (JP)

(73) Assignee: KABUSHIKI KAISHA ZUKEN, Kanagawa (JP)

( * ) Notice: Subject to any disclaimer, the term of this patent is extended or adjusted under 35 U.S.C. 154(b) by 0 days.

(21) Appl. No.: 14/454,277

(22) Filed: Aug. 7, 2014

(65) Prior Publication Data

US 2014/0351786 A1 Nov. 27, 2014

Related U.S. Application Data

(63) Continuation of application No. PCT/JP2013/000612, filed on Feb. 5, 2013.

(30) Foreign Application Priority Data

Apr. 11, 2012 (JP) .................................. 2012-090437

(51) Int. Cl.
*G06F 17/50* (2006.01)
*H01L 39/24* (2006.01)
(Continued)

(52) U.S. Cl.
CPC .......... *H05K 3/0005* (2013.01); *G06F 17/5072* (2013.01); *G06F 17/5077* (2013.01);
(Continued)

(58) Field of Classification Search
CPC ............ G06F 17/5072; G06F 17/5077; G06F 2217/12; G06F 19/00; H01L 39/24; H01L 21/82; H05K 3/0005; H05K 3/1241

USPC ............ 716/137; 700/97, 109, 117, 118, 121, 700/145; 438/129; 29/599

See application file for complete search history.

(56) References Cited

U.S. PATENT DOCUMENTS

| 6,069,971 A | 5/2000 | Kanno et al. |
| 8,099,707 B1 * | 1/2012 | Li ................................. 716/139 |

(Continued)

FOREIGN PATENT DOCUMENTS

| JP | 10-177589 A | 6/1998 |
| JP | 11-184064 A | 7/1999 |

(Continued)

OTHER PUBLICATIONS

Atsushi Ushiroda, et al., "High quality imaging by new dithering method and its evaluation", ITE Technical Report, The Institute of Image Information and Television Engineers, Oct. 17, 1997, vol. 21, No. 59, pp. 25-30, English abstract.

(Continued)

*Primary Examiner* — Phallaka Kik
(74) *Attorney, Agent, or Firm* — Fitzpatrick, Cella, Harper & Scinto (57) ABSTRACT

An information processing apparatus is configured to compute the shape of a conductive pattern to be formed on a board by a drawing apparatus that performs drawing on the board using conductive liquid droplets. The information processing apparatus includes an image data generation unit configured to generate image data in which dots each having a diameter determined according to a drawing condition of a conductive pattern by the drawing apparatus are arranged at respective positions which are indicated by data of a conductive pattern and at which conductive liquid droplets are to be landed.

21 Claims, 11 Drawing Sheets

(51) Int. Cl.
    *H01L 21/82*     (2006.01)
    *H05K 3/00*     (2006.01)
    *G06F 19/00*     (2011.01)
    *H05K 3/12*     (2006.01)

(52) U.S. Cl.
    CPC ............ *G06F19/00* (2013.01); *G06F 2217/12* (2013.01); *H01L 21/82* (2013.01); *H01L 39/24* (2013.01); *H05K 3/1241* (2013.01)

(56) References Cited

U.S. PATENT DOCUMENTS

| | | | |
|---|---|---|---|
| 9,000,557 B2 * | 4/2015 | Or-Bach et al. | 257/506 |
| 9,036,181 B2 * | 5/2015 | Chang et al. | 358/1.15 |
| 2004/0235227 A1 * | 11/2004 | Kawase | 438/158 |
| 2005/0259128 A1 * | 11/2005 | Kusunoki | 347/42 |
| 2008/0199816 A1 * | 8/2008 | Choi et al. | 430/322 |
| 2009/0034833 A1 | 2/2009 | Ozaki et al. | |
| 2010/0014105 A1 | 1/2010 | Yun et al. | |
| 2010/0020167 A1 | 1/2010 | Zandifar et al. | |
| 2010/0296225 A1 * | 11/2010 | Smith et al. | 361/311 |
| 2010/0330504 A1 * | 12/2010 | Irisawa et al. | 430/313 |
| 2011/0057191 A1 * | 3/2011 | Murakami | 257/59 |
| 2014/0158193 A1 * | 6/2014 | Desphande et al. | 136/256 |

FOREIGN PATENT DOCUMENTS

| | | | |
|---|---|---|---|
| JP | 2001-142565 A | | 5/2001 |
| JP | 2005-085877 A | | 3/2005 |
| JP | 2006001276 A | * | 1/2006 |
| JP | 2007-152167 A | | 6/2007 |
| JP | 2008-242885 A | | 10/2008 |
| JP | 2009-255007 A | | 11/2009 |
| JP | 2010-033571 A | | 2/2010 |
| JP | 2010-135499 A | | 6/2010 |
| WO | 2006/126457 A1 | | 11/2006 |

OTHER PUBLICATIONS

International Search Report for PCT/JP2013/000612, mailed Mar. 5, 2013, 4 pages.

* cited by examiner

HIGH RESOLUTION

FIG. 4B

LOW RESOLUTION

FIG. 5A

HIGH RESOLUTION

FIG. 5B

LOW RESOLUTION

INFORMATION PROCESSING APPARATUS, INFORMATION PROCESSING METHOD, PROGRAM, AND BOARD MANUFACTURING SYSTEM

This application is a continuation of International Patent Application No. PCT/JP2013/000612 filed on Feb. 5, 2013, and claims priority to Japanese Patent Application No. 2012-090437 filed on Apr. 11, 2012, the entire content of both of which is incorporated herein by reference.

TECHNICAL FIELD

The present invention relates to an information processing apparatus and information processing method for computing the shape of a conductive pattern to be formed on a board by a drawing apparatus that performs drawing on the board using conductive liquid droplets, a program for causing a computer to operate as the information processing apparatus, and a board manufacturing system.

BACKGROUND ART

A method using a lithography technique is the mainstream as a method of manufacturing a wiring board such as a printed circuit board and package board. However, the method using the lithography technique requires a conductive layer formation step, a resist application step, an exposure step, a development step, an etching step, a resist pattern removal step, and the like, and is thus disadvantageous in terms of cost and time required for the manufacture.

PTL 1 discloses an apparatus for forming a wiring pattern by an inkjet method. This apparatus forms a pattern on the surface of a board by discharging a liquid material by the inkjet method, and is more accurately a drawing apparatus for drawing a conductive pattern on a board using conductive liquid droplets.

CITATION LIST

Patent Literature

PTL 1: Japanese Patent Laid-Open No. 2009-255007

SUMMARY OF INVENTION

Technical Problem

At present, when a drawing apparatus for performing drawing using conductive liquid droplets is used to form a conductive pattern on a board, the drawing apparatus is operated according to drawing data in a raster format converted from data in a vector format of a conductive pattern designed using a CAD tool.

However, the shape of the conductive pattern expressed by the data in the raster format does not perfectly coincide with the shape of the conductive pattern expressed by the original data in the vector format. Furthermore, the shape of the conductive pattern actually drawn on the substrate using conductive liquid droplets is different from that of the conductive pattern expressed by the data in the raster format. At present, the conductive pattern actually drawn on the board is evaluated, and adjustment is then performed to obtain a proper conductive pattern while changing the drawing condition in the drawing apparatus and the surface processing condition of the board based on the evaluation result, and changing drawing data. Considerable time and cost are, therefore, required to complete adjustment.

The present invention has been made based on the recognition of the aforementioned problem, and has as its object to provide a technique advantageous in efficiently generating data to be provided to a drawing apparatus.

Solution to Problem

The first aspect of the present invention relates to an information processing apparatus for computing a shape of a conductive pattern to be formed on a board by a drawing apparatus that performs drawing on the board using conductive liquid droplets. The information processing apparatus comprises an image data generation unit configured to generate image data in which dots each having a diameter determined according to a drawing condition of a conductive pattern by the drawing apparatus are arranged at respective positions which are indicated by data of a conductive pattern and at which conductive liquid droplets are to be landed.

The second aspect of the present invention relates to a board manufacturing system. The board manufacturing system comprises an information processing apparatus according to the first aspect, and a drawing apparatus configured to draw a conductive pattern on a board based on data generated by the information processing apparatus.

The third aspect of the present invention relates to an information processing method of computing a shape of a conductive pattern to be formed on a board by a drawing apparatus that performs drawing on the board using conductive liquid droplets. The information processing method comprises an image data generation step of generating image data in which dots each having a diameter determined according to a drawing condition of a conductive pattern by the drawing apparatus are arranged at respective positions which are indicated by data of a conductive pattern and at which conductive liquid droplets are to be landed.

The fourth aspect of the present invention relates to a program. The program causes a computer to operate as an information processing apparatus for computing a shape of a conductive pattern to be formed on a board by a drawing apparatus that performs drawing on the board using conductive liquid droplets. The information processing apparatus comprises an image data generation unit configured to generate image data in which dots each having a diameter determined according to a drawing condition of a conductive pattern by the drawing apparatus are arranged at respective positions which are indicated by data of a conductive pattern and at which conductive liquid droplets are to be landed.

Advantageous Effects of Invention

According to the present invention, there is provided a technique advantageous in efficiently generating data to be provided to a drawing apparatus.

DESCRIPTION OF EMBODIMENTS

A preferred embodiment of the present invention will be described below with reference to the accompanying drawings.

Figure 1:
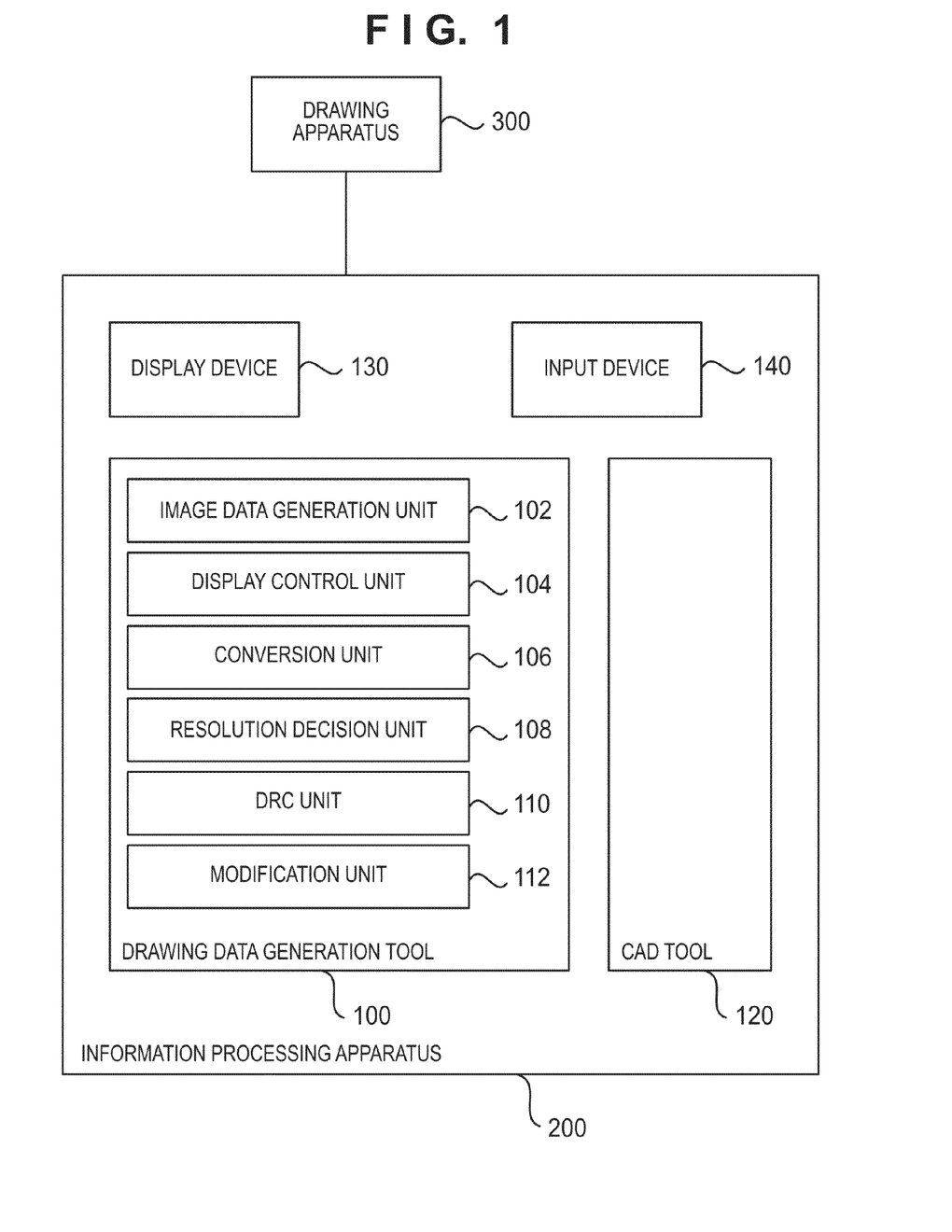
FIG. 1 is a block diagram schematically showing the arrangement of a board manufacturing system according to a preferred embodiment of the present invention.

FIG. 1 schematically shows the arrangement of a board manufacturing system according to the preferred embodiment of the present invention. The board manufacturing system includes an information processing apparatus 200 and a drawing apparatus 300. The drawing apparatus 300 forms a conductive pattern on a board by performing drawing on the board using conductive liquid droplets. For example, the apparatus described in PTL 1 can be used as the drawing apparatus 300.

The information processing apparatus 200 generates drawing data for controlling the drawing operation of the drawing apparatus 300, and provides the generated drawing data to the drawing apparatus 300. The drawing apparatus 300 draws a conductive pattern on the board (for example, a resin board) using conductive liquid droplets according to the drawing data. The information processing apparatus 200 can be formed by, for example, one or a plurality of computers. The plurality of computers are typically connected via a network such as a LAN.

The information processing apparatus 200 includes a drawing data generation tool 100. The drawing data generation tool 100 is typically implemented by installing a computer-readable program onto a computer. The program can be stored in a medium, or provided to the computer via the network. The drawing data generation tool 100 computes the shape of the conductive pattern to be formed on the board by the drawing apparatus 300. The drawing data generation tool 100 can include an image data generation unit 102. The drawing data generation tool 100 can also include at least one of a display control unit 104, a conversion unit 106, a resolution decision unit 108, a DRC (Design Rule Check) unit 110, and a modification unit 112. Note that the image data generation unit 102 is configured to execute an image data generation step, the display control unit 104 is configured to execute a display control step, the conversion unit 106 is configured to execute a conversion step, the resolution decision unit 108 is configured to execute a resolution decision step, the DRC unit 110 is configured to execute a DRC step, and the modification unit 112 is configured to execute a modification step.

The information processing apparatus 200 may include a CAD tool 120. The CAD tool 120 is typically implemented by installing a computer-readable program onto the computer. The program can be stored in a medium, or provided to the computer via the network. The CAD tool 120 can include, for example, a design tool for designing a wiring board. Design data generated by the design tool can include data expressing a conductive pattern to be formed on the board. The design data can be provided to the drawing data generation tool 100. The design data can typically be data that describes a conductive pattern in the vector format but may be data that describes a conductive pattern in the raster format, data including both the vector format and the raster format, or data in another format.

The information processing apparatus 200 can further include a display device 130 and an input device 140. The display device 130 and the input device (for example, a pointing device such as a mouse and pad, and a keyboard) 140 form a user interface. The display device 130 and the input device 140 are not limited to specific devices, and can be formed by various devices.

The image data generation unit 102 generates image data in which dots each having a diameter determined according to the drawing condition of a conductive pattern by the drawing apparatus 300 are arranged at respective positions (dot formation positions) which are indicated by data of the conductive pattern and at which conductive liquid droplets are to be landed. The data of the conductive pattern can be the design data generated by the CAD tool 120. The data of the conductive pattern can be the data converted by the conversion unit 106 from the design data generated by the CAD tool 120. The data of the conductive pattern can be data obtained by processing such design data by the modification unit 112. The image data generated by the image data generation unit 102 may typically be data in the vector format but may be data in the raster format or data in another format. The display control unit 104 causes the display device 130 to display the conductive pattern based on the image data generated by the image data generation unit 102. The data of the finally decided conductive pattern is provided to the drawing apparatus 300 as drawing data. Note that the image data provided to the display device 130 is data expressing the shape of the conductive pattern that can be formed by the drawing apparatus 300 while the drawing data provided to the drawing apparatus 300 is data (typically, data in the raster format) for controlling the drawing operation of the drawing apparatus 300.

When the conversion unit 106 needs to process the data of the conductive pattern described in the vector format, it converts the data into data in the raster format according to a resolution at which the drawing apparatus 300 performs drawing. The data of the conductive pattern described in the vector format can be generated and stored in a memory (not shown) by the CAD tool 120, and read out by the drawing data generation tool 100. Based on the data in the raster format generated by the conversion unit 106, the image data generation unit 102 can generate image data in the raster format in which dots each having a diameter determined according to the drawing condition of the conductive pattern by the drawing apparatus 300 are arranged at respective positions (dot formation positions) at which conductive liquid droplets are to be landed. The image data generation unit 102 is further configured to convert the image data in the raster format into image data in the vector format, and provide the obtained image data to the display control unit 104.

Figure 2A:
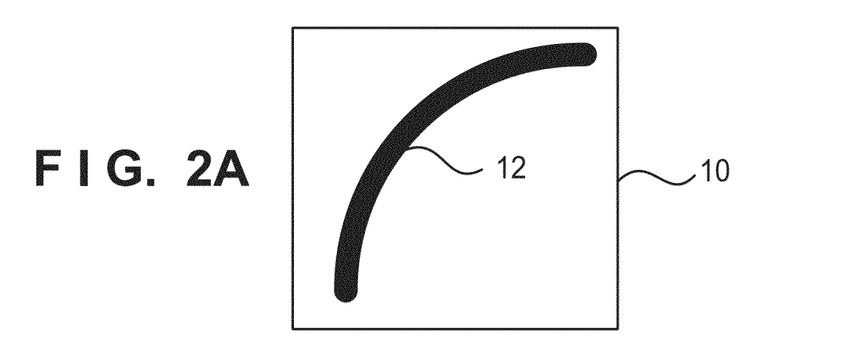
FIG. 2A is a view exemplifying design data generated by a CAD tool.

A more practical embodiment will be described below with reference to FIGS. 2A to 2C, 3A, 3B, 4A, 4B, 5A, 5B, 6A, 6B, 7A, 7B, 8A, 8B, 9, 10A to 10C, 11A, and 11B. Image data generated by the image data generation unit 102 will be exemplarily explained first with reference to FIGS. 2A to 2C. As an example, assume that data generated by CAD tool 120 is data of a conductive pattern described in the vector format. FIG. 2A schematically shows design data 10 generated by the CAD tool 120. The design data 10 includes data of a conductive pattern 12 described in the vector format.

Figure 2B:
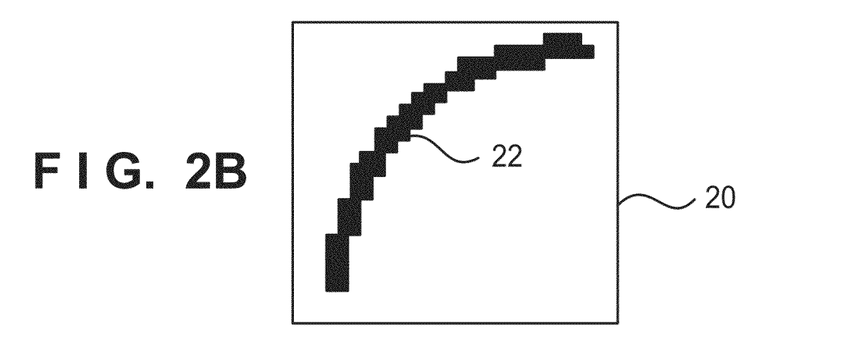
FIG. 2B is a view exemplifying drawing data obtained by converting the design data into the raster format by a conversion unit.

FIG. 2B schematically shows drawing data 20 obtained by converting the design data 10 into the raster format by the conversion unit 106. The drawing data 20 is drawing data having a resolution at which the drawing apparatus 300 performs drawing. The drawing data 20 includes data of a conductive pattern 22 described in the raster format.

Figure 2C:
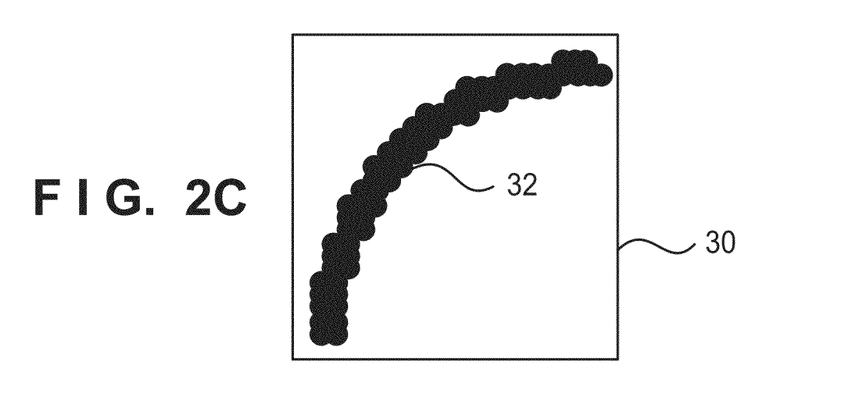
FIG. 2C is a view exemplifying image data generated by an image data generation unit.

FIG. 2C schematically shows image data 30 generated by the image data generation unit 102 based on the drawing data 20. As described above, the image data generation unit 102 generates the image data 30 in which dots each having a diameter determined according to the drawing condition of the conductive pattern by the drawing apparatus 300 are arranged at respective positions (dot formation positions) which are indicated by the drawing data 20 and at which conductive liquid droplets are to be landed.

The shape of the conductive pattern 22 described in the raster format is different from that of a conductive pattern 32 obtained by processing the conductive pattern 22. The conductive pattern 32 is obtained by considering the diameter of the dots serving as the drawing condition for the drawing apparatus 300, and is faithful to the conductive pattern 32 actually formed by the drawing apparatus 300. The display control unit 104 displays the image of the conductive pattern 32 on the display device 130 based on the image data 30. The user can accurately recognize the conductive pattern actually formed by the drawing apparatus 300 by confirming the image of the conductive pattern 32 displayed on the display device 130. This makes it possible to discover a fault before actually forming the conductive pattern on the board using the drawing apparatus 300.

Furthermore, as will be described later, it is possible to perform a design rule check using the DRC unit 110 based on the image data 30 including the conductive pattern 32, modify, based on the result of the design rule check, the drawing data 20 of the conductive pattern 22 as the base of the image data 30 using the modification unit 112, and provide the modified drawing data to the drawing apparatus 300.

Figure 3A:
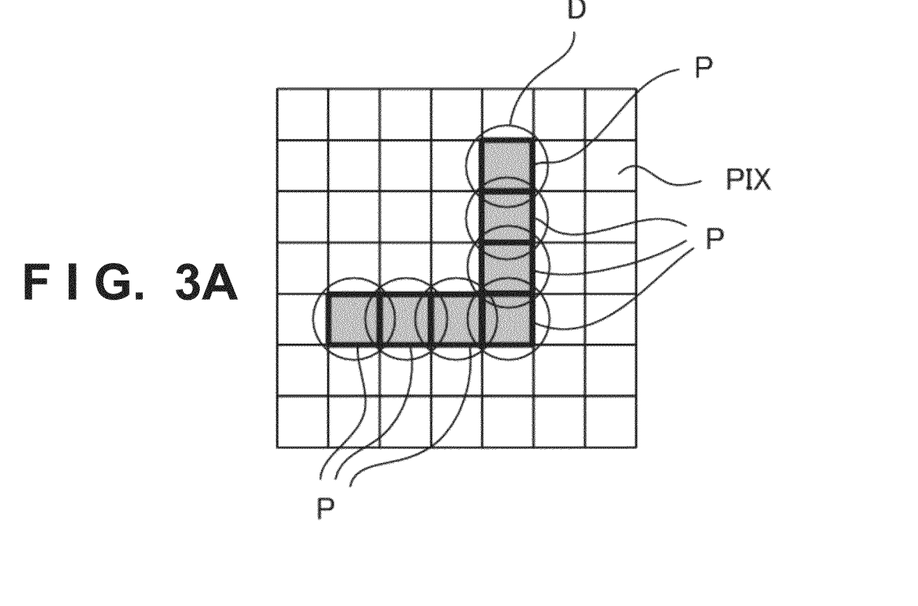
FIG. 3A is a view exemplifying drawing data including a conductive pattern.

Generation of image data by the image data generation unit 102 will be exemplarily described with reference to FIGS. 3A and 3B. FIG. 3A schematically shows drawing data including a conductive pattern. The drawing data defines the shape of the conductive pattern in a two-dimensional array of pixels PIX. The conductive pattern is formed by a set of respective positions (dot formation positions) P at which conductive liquid droplets are to be landed. Each position at which a conductive liquid droplet is to be landed can typically be given by the position of the pixel PIX, more specifically, the central position of the pixel PIX. The diameter of a dot D formed by landing a conductive liquid droplet at each position is determined according to the specifications of the drawing apparatus 300. The drawing condition under which the drawing apparatus 300 forms the conductive pattern includes the diameter of the dot D to be formed. Typically, the drawing apparatus 300 can be configured to select the diameter of the dot from a plurality of choices.

Figure 3B:
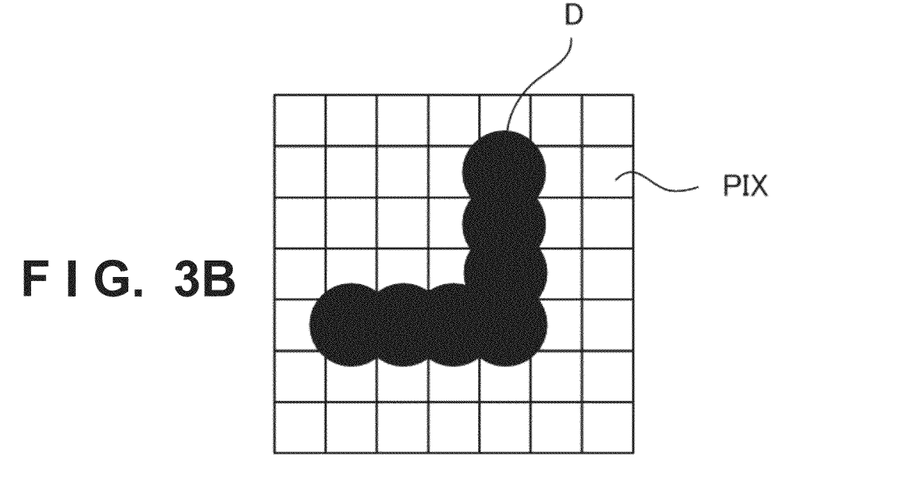
FIG. 3B is a view exemplifying image data generated by the image data generation unit.

The image data generation unit 102 generates image data by arranging the dot D having the diameter determined according to the drawing condition at each position (dot formation position) P at which a conductive liquid droplet is to be landed, as schematically shown in FIG. 3A, and filling the dot D, as schematically shown in FIG. 3B.

The resolution at which the drawing apparatus 300 performs drawing may be arbitrarily set by the user according to the specifications of the drawing apparatus 300, but may also be decided by the resolution decision unit 108. The resolution decision unit 108 may be configured to decide the resolution without depending on an instruction from the user, or provide information usable for deciding the resolution to the user and decide the resolution according to a response to it from the user.

Figure 4A:
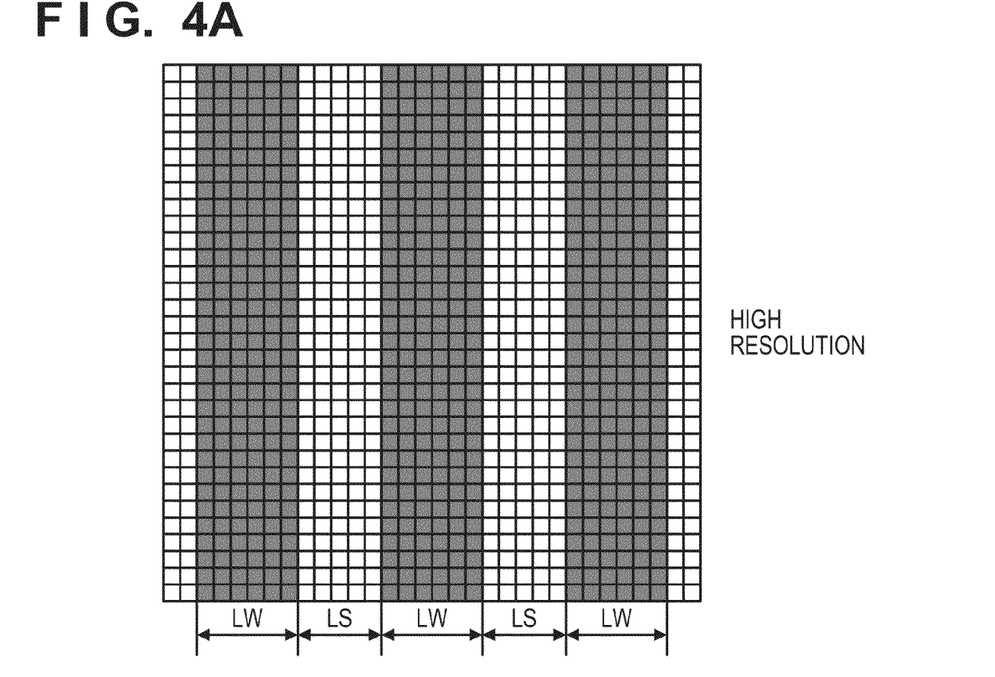
FIG. 4A is a view exemplifying the operation of a resolution decision unit.
Figure 4B:
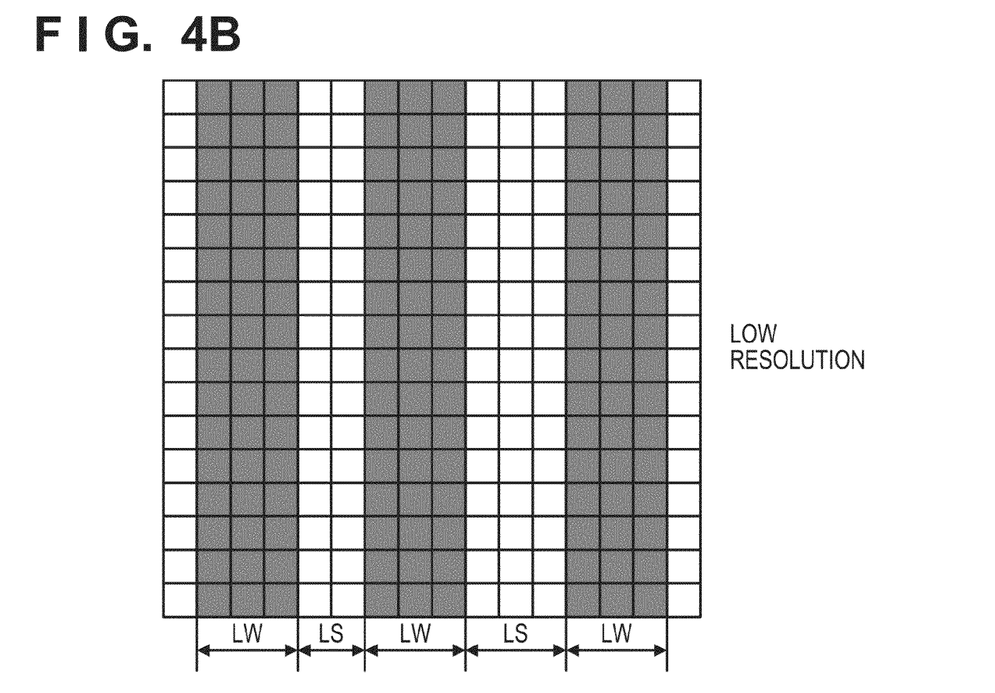
FIG. 4B is a view exemplifying the operation of the resolution decision unit.

The operation of the resolution decision unit 108 will be exemplarily described with reference to FIGS. 4A, 4B, 5A, and 5B. FIG. 4A shows a case in which design data (data of a conductive pattern) in the vector format is converted into drawing data in the raster format at a high resolution. FIG. 4B shows a case in which the same design data is converted into drawing data in the raster format at a low resolution. Each square represents a pixel.

At the high resolution exemplified in FIG. 4A, a plurality of line widths LW are equal to each other, and a plurality of inter-line spaces LS are equal to each other. On the other hand, at the low resolution (that is, the resolution is insufficient) exemplified in FIG. 4B, the plurality of line widths LW are equal to each other but the plurality of inter-line spaces LS are different from each other. Although not shown in FIG. 4B, the plurality of line widths LW may be different from each other.

Figure 5A:
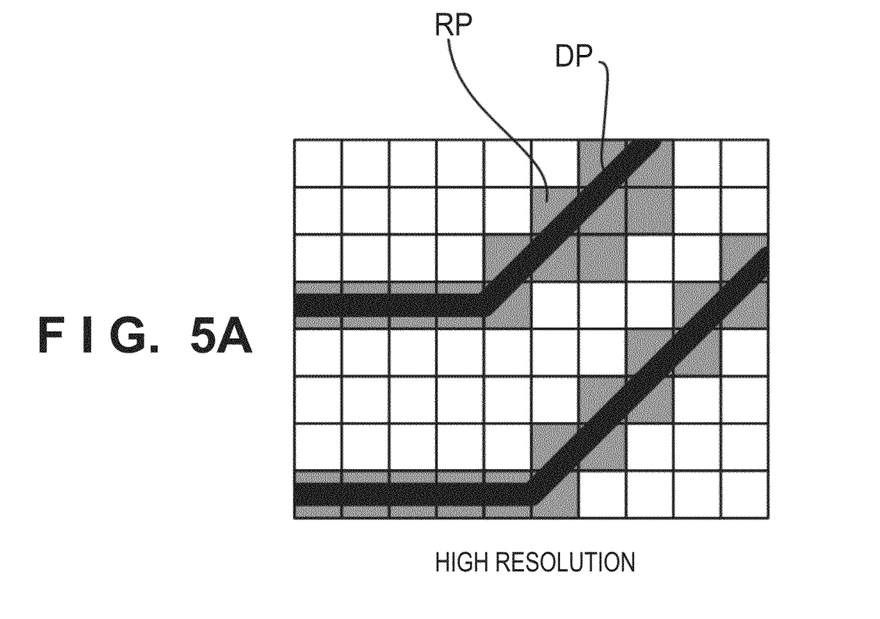
FIG. 5A is a view exemplifying the operation of the resolution decision unit.
Figure 5B:
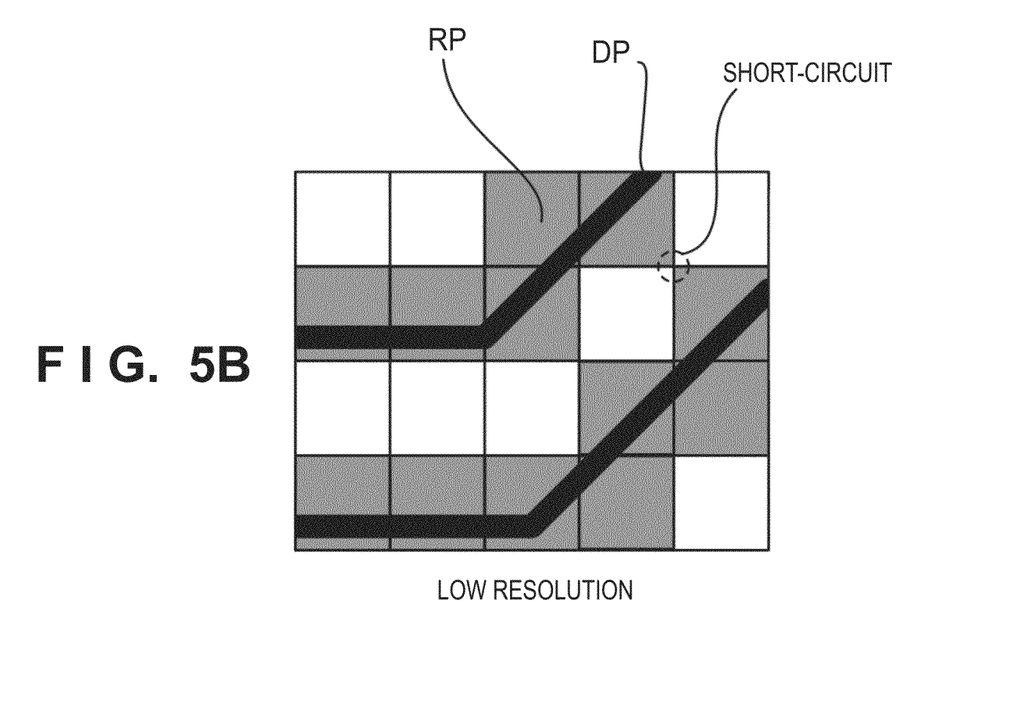
FIG. 5B is a view exemplifying the operation of the resolution decision unit.

FIG. 5A shows a case in which design data in the vector format is converted into drawing data in the raster format at a high resolution. FIG. 5B shows a case in which the same design data is converted into drawing data in the raster format at a low resolution. Each square represents a pixel. Reference symbol DP denotes a conductive pattern in the design data; and RP, a conductive pattern in the drawing data. At the low resolution (that is, the resolution is insufficient) shown in FIG. 5B, the conductive patterns are short-circuited.

The resolution decision unit 108 decides a resolution required for the drawing apparatus 300 to perform drawing, based on at least one of a minimum line width and minimum inter-line space required for the conductive pattern to be formed by the drawing apparatus 300. This resolution is a resolution set in the drawing apparatus 300, the resolution of the drawing data provided to the drawing apparatus 300, and the resolution of the drawing data generated by the conversion unit 106. Note that the resolution decision unit 108 may decide a lowest resolution required for the drawing apparatus 300 to perform drawing, based on at least one of the minimum line width and minimum inter-line space required for the conductive pattern to be formed by the drawing apparatus 300. The display control unit 104 may cause the display device 130 to display information indicating the lowest resolution. The user can arbitrarily decide the resolution based on the lowest resolution.

Based on at least one of the minimum line width and the minimum inter-line space, the resolution decision unit 108 decides a sufficient resolution to satisfy it. In a simple example, a table for associating resolutions with the minimum line width and the minimum inter-line space is prepared, and then the resolution can be decided with reference to the table.

Figure 6A:
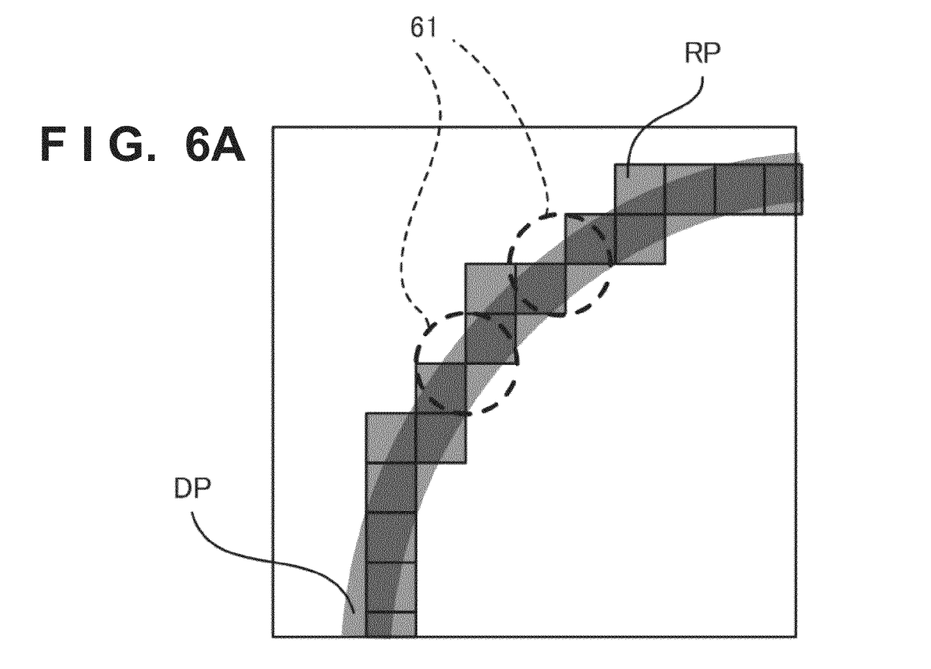
FIG. 6A is a view exemplifying the operation of the conversion unit.
Figure 6B:
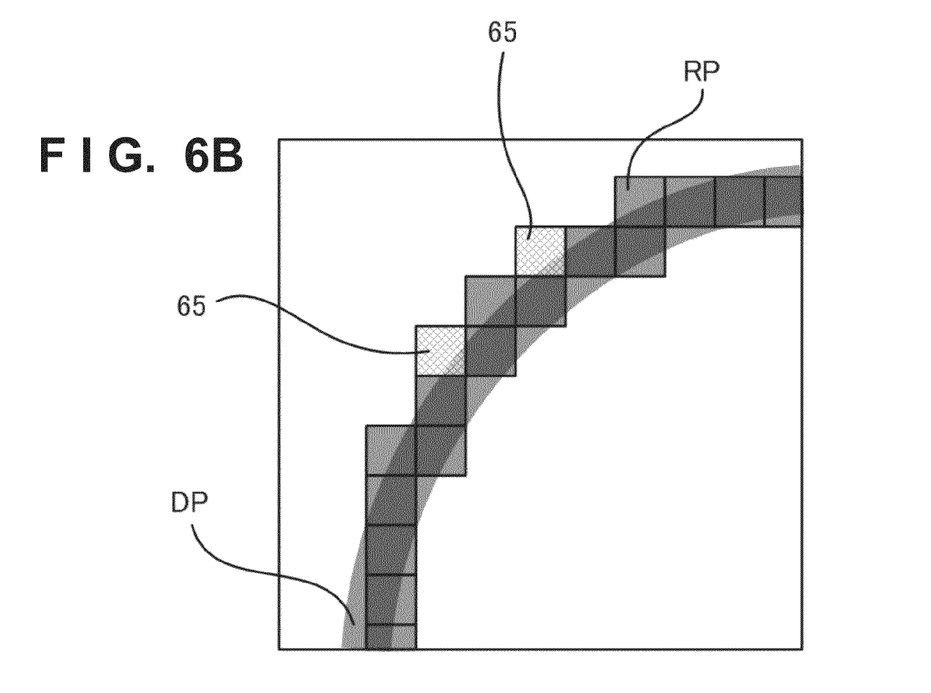
FIG. 6B is a view exemplifying the operation of the conversion unit.

The operation of the conversion unit 106 will be described with reference to FIGS. 6A and 6B. Referring to FIGS. 6A and 6B, reference symbol DP denotes a conductive pattern in design data; RP, a conductive pattern in drawing data, which is formed by a set of squares. Referring to FIG. 6A, in portions denoted by reference numeral 61, a disconnection failure may occur. To solve this problem, when converting data of the conductive pattern DP described in the vector format into data in the raster format according to the resolution at which the drawing apparatus 300 performs drawing, the conversion unit 106 performs conversion so that the width of the conductive pattern RP in the data in the raster format satisfies a reference width. More specifically, as exemplified in FIG. 6B, the conversion unit 106 complements the portions 61, where a disconnection failure may occur, by pixels 65 to form the conductive pattern.

Figure 7A:
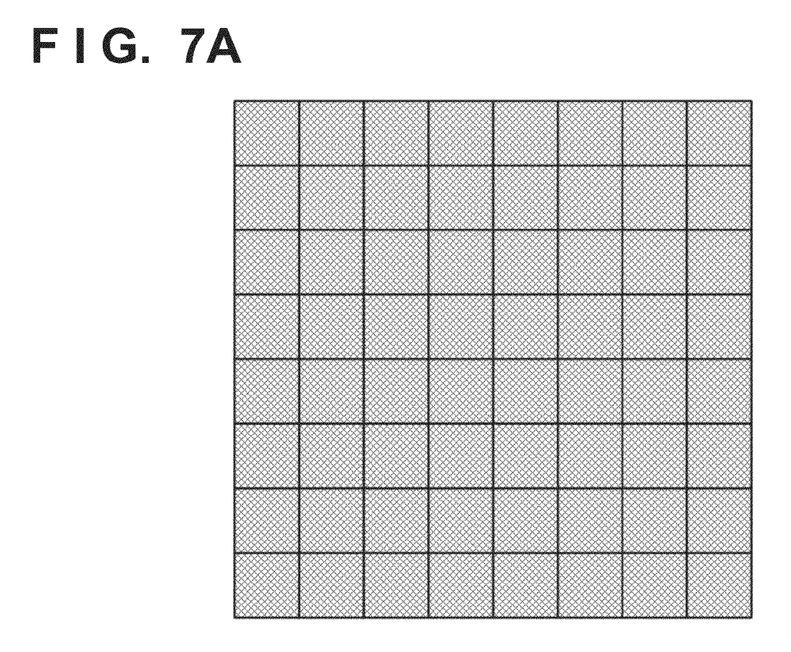
FIG. 7A is a view exemplifying the operation of the conversion unit.
Figure 7B:
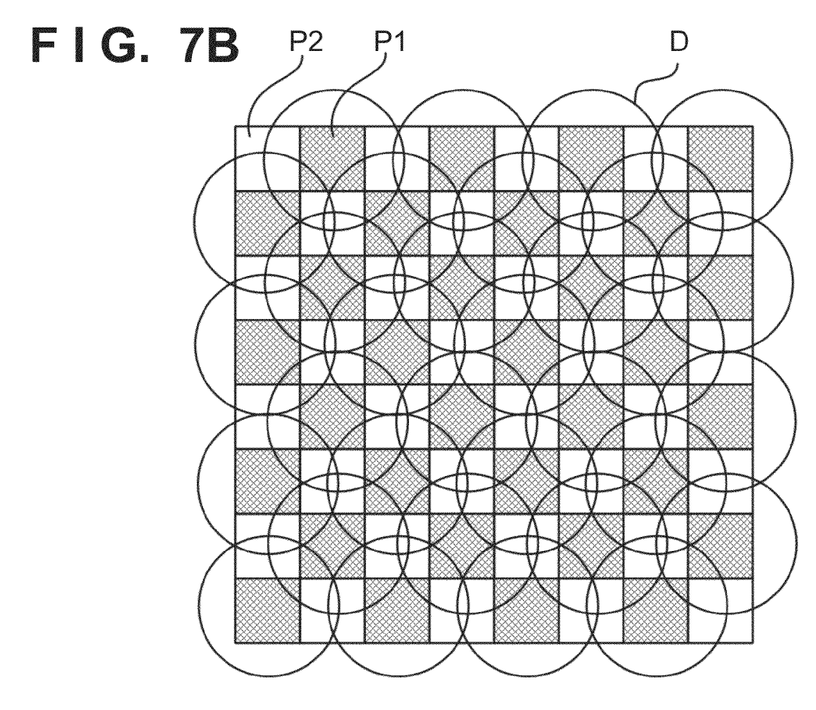
FIG. 7B is a view exemplifying the operation of the conversion unit.

Thinning processing when the conversion unit 106 converts the data (design data) of the conductive pattern in the vector format into the data (drawing data) of the conductive pattern in the raster format will be described with reference to FIGS. 7A, 7B, 8A, and 8B. FIG. 7A schematically shows the data (drawing data) of the conductive pattern in the raster format generated without performing thinning processing. FIG. 7B schematically shows the data (drawing data) of the conductive pattern in the raster format generated while performing thinning processing. In the example shown in FIG. 7B, among positions (pixels) P1 and P2 at which conductive liquid droplets are to be landed, the positions P2 are thinned out. Note that referring to FIG. 7B, the positions (pixels) P1 are represented by hatched squares, and the positions (pixels) P2 are represented by squares without hatching. In each region D, a dot is formed by a conductive liquid droplet. The conversion unit 106 has a function of prompting the user to select a thinning rule to be used for thinning processing from a plurality of thinning rules. This function is provided to the user via the user interface formed by the display device 130 and the input device 140.

Figure 8A:
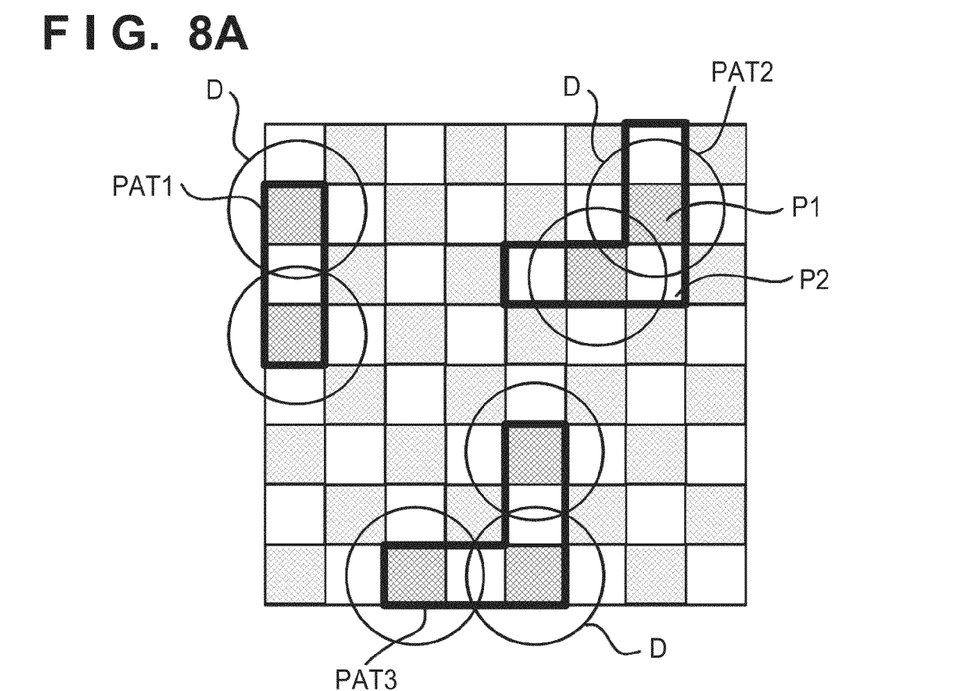
FIG. 8A is a view exemplifying the operation of the conversion unit.
Figure 8B:
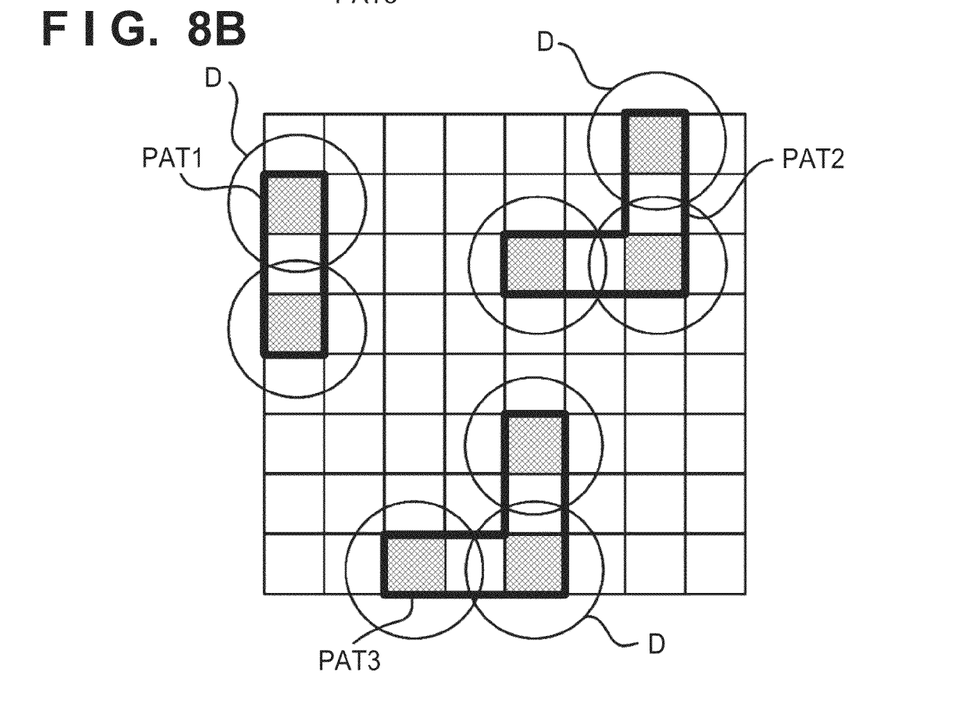
FIG. 8B is a view exemplifying the operation of the conversion unit.

FIGS. 8A and 8B each exemplify thinned-out conductive patterns PAT1, PAT2, and PAT3. The conductive patterns PAT2 and PAT3 are identical, and the conductive pattern PAT1 is different from the conductive patterns PAT2 and PAT3. As shown in FIG. 8A, although the conductive patterns PAT2 and PAT3 have the same shape, positions where dots are to be formed are different from each other after thinning processing. In this case, the shapes of the conductive patterns actually formed on the board are different from each other.

To solve this problem, as exemplified in FIG. 8B, the conversion unit 106 preferably thins out the conductive patterns PAT2 and PAT3 having the same shape before conversion so that the thinned-out patterns coincide with each other. The conversion unit 106 can be configured to count the number of pixels forming each conductive pattern, group the conductive patterns having the same number of pixels, and determine whether the conductive patterns of each group have the same shape. For example, the number of pixels forming the conductive pattern PAT1 is three, the number of pixels forming the conductive pattern PAT2 is five, and the number of pixels forming the conductive pattern PAT3 is five. Therefore, for example, the conductive pattern PAT1 can be grouped into the first group, and the conductive patterns PAT2 and PAT3 can be grouped into the second group. Since the plurality of conductive patterns PAT1 and PAT2 belong to the second group, the conversion unit 106 determines whether the conductive patterns PAT1 and PAT2 have the same shape. Whether the conductive patterns have the same shape is preferably determined in consideration of rotational symmetry or line symmetry. That is, it is preferably determined that patterns having rotational symmetry or line symmetry have the same shape.

Note that in the example shown in FIG. 8B, the conductive pattern PAT2 undergoes the same thinning processing as that for the conductive pattern PAT3 in FIG. 8A. However, the conductive pattern PAT3 may undergo the same thinning processing as that for the conductive pattern PAT2 in FIG. 8A. The thinning rule is not limited to the example explained here, and can be arbitrarily determined.

Figure 9:
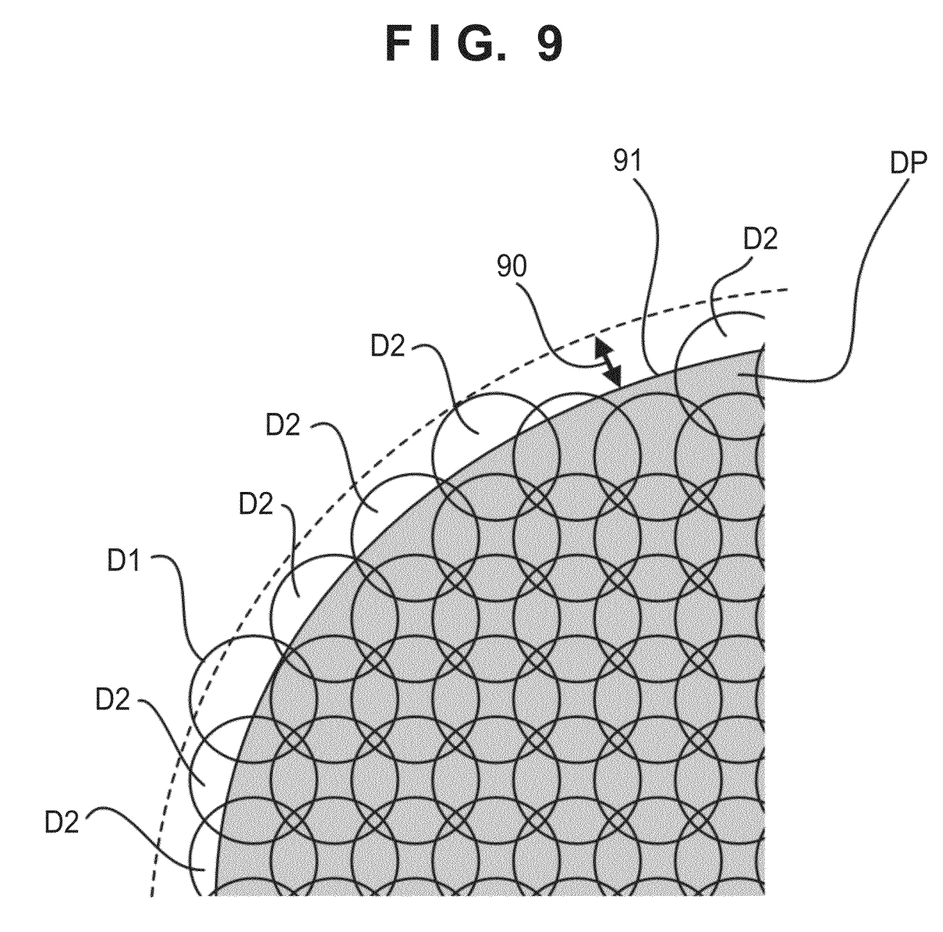
FIG. 9 is a view exemplifying the operation of a modification unit.

The operation of the modification unit 112 will be described with reference to FIG. 9. Reference symbol DP denotes a conductive pattern in design data; and D1 and D2, dots that can be formed using conductive liquid droplets. If the shift amount between a boundary 91 of the conductive pattern (the conductive pattern in the design data) DP on the design data and the boundary of the conductive pattern (that is, a set of the dots D1 and D2) expressed by the image data generated by the image data generation unit 102 does not satisfy a tolerance amount 90, the modification unit 112 modifies the data (drawing data) of the conductive pattern as the base of the image data so as to satisfy the tolerance amount. More specifically, since the boundary of the dot D1 does not satisfy the tolerance amount 90, the modification unit 112 modifies the data (drawing data) of the conductive pattern as the base of the image data so as to remove the dot D1 (that is, the modification unit 112 deletes a pixel corresponding to the dot D1 from a group of pixels forming the conductive pattern).

Figure 10A:
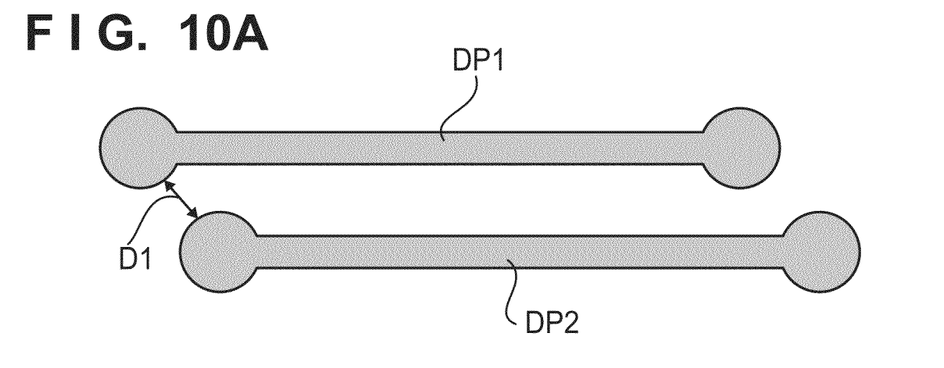
FIG. 10A is a view exemplifying the operation of a DRC unit and the modification unit.

The modification unit 112 may be provided together with the DRC unit 110. The operation of the DRC unit 110 and modification unit 112 will be described with reference to FIGS. 10A to 10C. FIG. 10A exemplarily shows conductive patterns DP1 and DP2 in the design data. The conductive patterns DP1 and DP2 in the design data satisfy the design rule (in this example, an inter-line distance D1 satisfies the design rule).

Figure 10B:
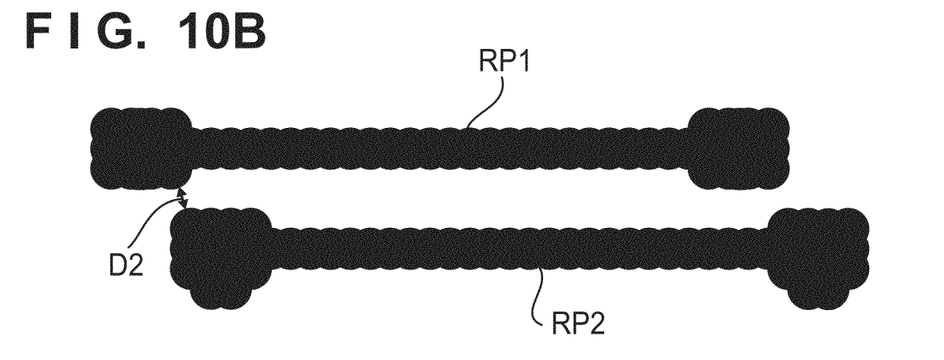
FIG. 10B is a view exemplifying the operation of the DRC unit and modification unit.

FIG. 10B exemplarily shows conductive patterns RP1 and RP2 in the image data generated by the image data generation unit 102. As described above, the conversion unit 106 converts the design data in the vector format expressing the conductive patterns DP1 and DP2 into drawing data in the raster format. The image data generation unit 102 generates image data in which dots each having a diameter determined according to the drawing condition of the conductive pattern by the drawing apparatus 300 are arranged at the respective positions (dot formation positions) which are indicated by the drawing data and at which conductive liquid droplets are to be landed. The conductive patterns RP1 and RP2 in the image data are obtained by estimating conductive patterns to be actually formed by the drawing apparatus 300.

Figure 10C:
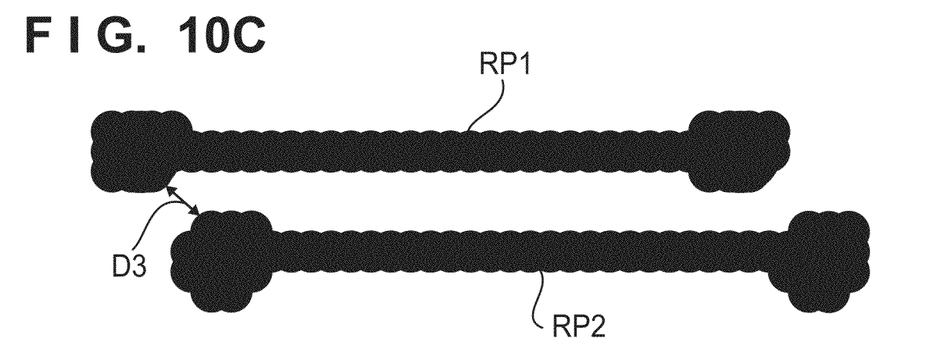
FIG. 10C is a view exemplifying the operation of the DRC unit and modification unit.

Referring to FIG. 10B, the conductive patterns RP1 and RP2 do not satisfy the design rule (in this example, an inter-line distance D2 does not satisfy the design rule). The DRC unit 110 executes a DRC based on the image data generated by the image data generation unit 102. The display control unit 104 can display the result of the DRC on the display device 130. Based on the display, the user can modify the drawing data. Alternatively, as shown in FIG. 10C, the modification unit 112 may modify the data of the conductive pattern as the base of the image data, that is, the drawing data so as to remove a dot which prevents the design rule from being satisfied. Referring to FIG. 10C, the conductive patterns RP1 and RP2 satisfy the design rule (in this example, an inter-line distance D3 satisfies the design rule). The above example shows a case in which the inter-line distance D1 does not satisfy the design rule, and is merely an example. For example, even if the line width does not satisfy the design rule, the DRC unit 110 can determine it. In this case, the modification unit 112 can modify the data of the conductive pattern as the base of the image data, that is, the drawing data so as to decrease the line width.

Note that the DRC unit 110 may optionally execute a DRC for the drawing data in the raster format provided by the conversion unit 106.

The operation of the display control unit 104 will be described with reference to FIGS. 11A and 11B.

Figure 11A:
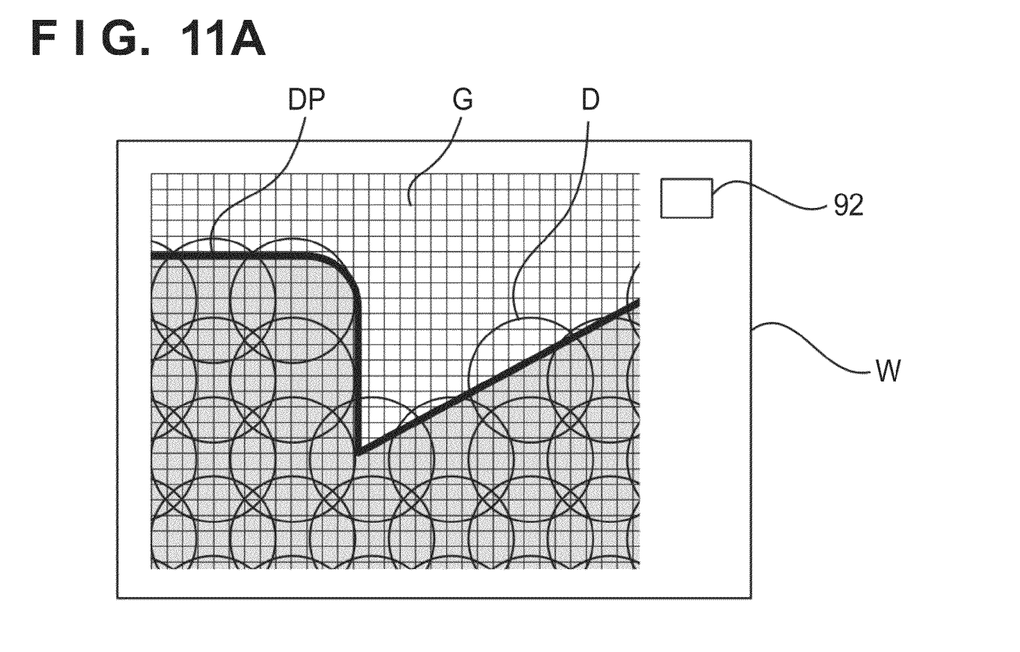
FIG. 11A is a view exemplifying the operation of a display control unit.
Figure 11B:
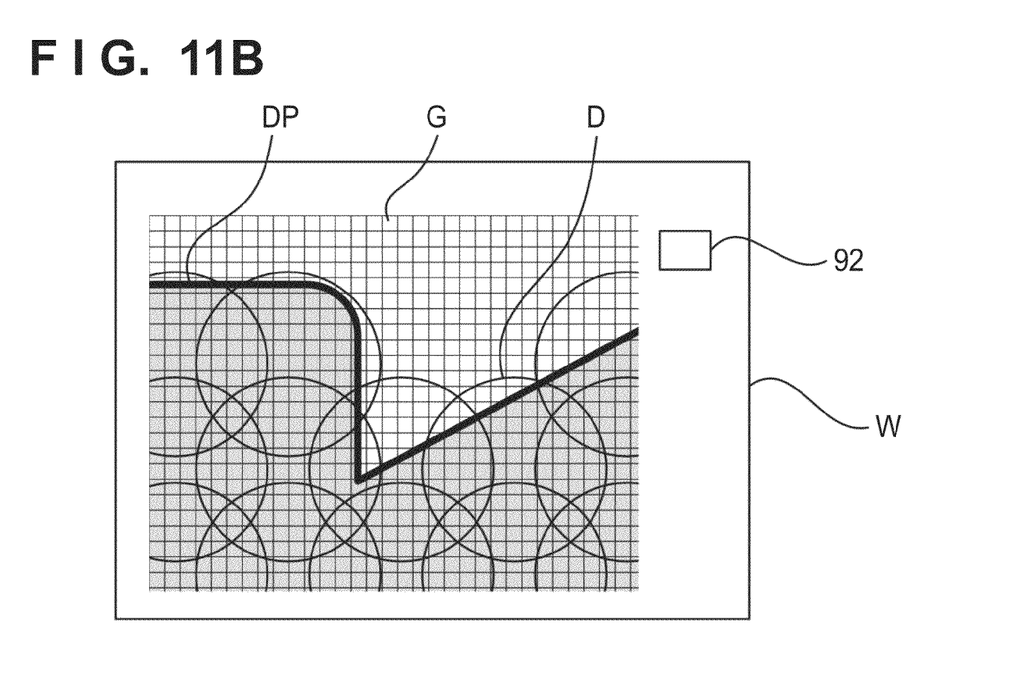
FIG. 11B is a view exemplifying the operation of the display control unit.

FIGS. 11A and 11B each exemplifies a window W displayed on the display device 130 by the display control unit 104. Reference symbol D denotes a dot that can be formed by a conductive liquid droplet; and DP, a conductive pattern in the design data. In the examples shown in FIGS. 11A and 11B, the sizes of the dots D formed by the drawing apparatus 300 are different from each other. The display control unit 104 can have a function of causing the display device 130 to display the designed conductive pattern DP such that the designed conductive pattern DP is overlaid on the conductive pattern (a set of the dots D in the examples of FIGS. 11A and 11B) expressed by the image data generated by the image data generation unit 102, as exemplified in FIGS. 11A and 11B. Based on the image displayed on the display device 130, the user can confirm the difference between the designed conductive pattern and the conductive pattern that can be formed by the drawing apparatus 300.

The display control unit 104 may also have a function of causing the display device 130 to display an evaluation value 92 indicating the difference between the designed conductive pattern DP and the conductive pattern (the set of the dots D in the examples of FIGS. 11A and 11B) expressed by the image data generated by the image data generation unit 102. Furthermore, the display control unit 104 may cause the display device 130 to display a grid G such that the grid G is overlaid on the designed conductive pattern DP and the conductive pattern expressed by the image data generated by the image data generation unit 102. The above-described evaluation value 92 can be a value obtained by evaluating, by the number of minimum elements (small squares) forming the grid G, the area of the different portion between the designed conductive pattern DP and the conductive pattern expressed by the image data generated by the image data generation unit 102.

The invention claimed is:

1. An information processing apparatus for computing a shape of a conductive pattern to be formed on a board by a drawing apparatus that performs drawing on the board using conductive liquid droplets, comprising:
a resolution decision unit configured to decide a resolution required for the drawing apparatus to perform drawing, based on at least one of a minimum line width and a minimum inter-line space required for the conductive pattern that are formed by the drawing apparatus; and
an image data generation unit configured to generate image data in which dots each having a diameter determined according to a drawing condition of a conductive pattern by the drawing apparatus are arranged at respective positions which are indicated by data of a conductive pattern which corresponds to the decided resolution and at which conductive liquid droplets are landed.

2. The information processing apparatus according to claim 1, wherein the resolution decision unit is configured to decide a lowest resolution required for the drawing apparatus to perform drawing, based on at least one of the minimum line width and the minimum inter-line space.

3. The information processing apparatus according to claim 1, further comprising a conversion unit configured to convert data of a conductive pattern described in a vector format into data of a conductive pattern in a raster format according to the decided resolution, wherein
based on the data of a conductive pattern in the raster format generated by the conversion unit, the image data generation unit generates the image data of the conductive pattern in the raster format in which dots each having the diameter determined according to the drawing condition are arranged at the respective positions where the conductive liquid droplets are landed.

4. The information processing apparatus according to claim 3, wherein when converting the data of the conductive pattern described in the vector format into the data of the conductive pattern in the raster format according to the resolution at which the drawing apparatus performs drawing, the conversion unit performs conversion so that a width of the conductive pattern in the data in the raster format satisfies a reference width.

5. The information processing apparatus according to claim 3, wherein when converting the data of the conductive pattern described in the vector format into the data of the conductive pattern in the raster format according to the resolution at which the drawing apparatus performs drawing, the conversion unit thins out positions where conductive liquid droplets are landed.

6. The information processing apparatus according to claim 5, wherein the conversion unit has a function of prompting a user to select a thinning rule to be used for thinning processing from a plurality of thinning rules.

7. The information processing apparatus according to claim 5, wherein the conversion unit thins out conductive patterns having the same shape before conversion so that the thinned-out patterns coincide with each other.

8. The information processing apparatus according to claim 7, wherein the conversion unit counts the number of pixels forming each conductive pattern, groups conductive patterns having the same number of pixels, and determines whether conductive patterns of each group have the same shape.

9. The information processing apparatus according to claim 3, further comprising a modification unit configured to modify the data of the conductive pattern as a base of the image data so as to satisfy the tolerance amount when a shift amount between a boundary of a designed conductive pattern and a boundary of a conductive pattern expressed by the image data generated by the image data generation unit does not satisfy a tolerance amount, wherein
the data of the conductive pattern as the base of the image data is the data of the conductive pattern in the raster format, which has been converted by the conversion unit.

10. The information processing apparatus according to claim 9, wherein the modification unit is configured to delete a pixel in the data of the conductive pattern as the base of the image data so as to satisfy the tolerance amount when the shift amount does not satisfy the tolerance amount.

11. The information processing apparatus according to claim 1, further comprising a modification unit configured to, when a shift amount between a boundary of a designed conductive pattern and a boundary of a conductive pattern expressed by the image data generated by the image data generation unit does not satisfy a tolerance amount, modify the data of the conductive pattern as a base of the image data so as to satisfy the tolerance amount.

12. The information processing apparatus according to claim 1, further comprising a DRC (Design Rule Check) unit configured to perform a design rule check for the conductive pattern expressed by the image data generated by the image data generation unit.

13. The information processing apparatus according to claim 12, further comprising a modification unit configured to, when the conductive pattern expressed by the image data generated by the image data generation unit does not satisfy the design rule, modify the data of the conductive pattern as a base of the image data so as to satisfy the design rule, and generate data to be provided to the drawing apparatus.

14. The information processing apparatus according to claim 13, wherein the design rule includes an inter-line distance, and
when the conductive pattern expressed by the image data generated by the image data generation unit does not satisfy the inter-line distance, the modification unit modifies the data of the conductive pattern as the base of the image data so as to satisfy the inter-line distance.

15. The information processing apparatus according to claim 13, wherein the design rule includes a line width, and
when the conductive pattern expressed by the image data generated by the image data generation unit does not satisfy the line width, the modification unit modifies the data of the conductive pattern as the base of the image data so as to satisfy the line width.

16. The information processing apparatus according to claim 1, further comprising a display control unit configured to cause a display device to display the designed conductive pattern such that the designed conductive pattern is overlaid on the conductive pattern expressed by the image data generated by the image data generation unit.

17. The information processing apparatus according to claim 16, wherein the display control unit is configured to cause the display device to display an evaluation value indicating a difference between the designed conductive pattern such that the designed conductive pattern is overlaid on the conductive pattern expressed by the image data generated by the image data generation unit.

18. The information processing apparatus according to claim 17, wherein the display control unit is configured to cause the display device to display a grid such that the grid is overlaid on the designed conductive pattern and the conductive pattern expressed by the image data generated by the image data generation unit.

19. A board manufacturing system comprising:
an information processing apparatus defined in claim 1; and
a drawing apparatus configured to draw a conductive pattern on a board based on the image data generated by the information processing apparatus.

20. An information processing method of computing a shape of a conductive pattern to be formed on a board by a drawing apparatus that performs drawing on the board using conductive liquid droplets, comprising:
a resolution decision step of deciding a resolution required for the drawing apparatus to perform drawing, based on at least one of a minimum line width and a minimum inter-line space required for the conductive pattern that are formed by the drawing apparatus; and
an image data generation step of generating image data in which dots each having a diameter determined according to a drawing condition of a conductive pattern by the drawing apparatus are arranged at respective positions which are indicated by data of a conductive pattern which corresponds to the decided resolution and at which conductive liquid droplets are landed.

21. A non-transitory computer readable medium storing a program for causing a computer to operate as an information processing apparatus for computing a shape of a conductive pattern to be formed on a board by a drawing apparatus that performs drawing on the board using conductive liquid droplets, said information processing apparatus comprising:
a resolution decision unit configured to decide a resolution required for the drawing apparatus to perform drawing, based on at least one of a minimum line width and a minimum inter-line space required for the conductive pattern that are formed by the drawing apparatus; and
an image data generation unit configured to generate image data in which dots each having a diameter determined according to a drawing condition of a conductive pattern by the drawing apparatus are arranged at respective positions which are indicated by data of a conductive pattern which corresponds to the decided resolution and at which conductive liquid droplets are landed.

* * * * *